US009178417B2

(12) United States Patent
Huang

(10) Patent No.: US 9,178,417 B2
(45) Date of Patent: Nov. 3, 2015

(54) DC-DC CONVERTER AND VOLTAGE CONVERSION METHOD THEREOF

(71) Applicant: uPI Semiconductor Corp., Hsinchu County (TW)

(72) Inventor: Hua-Chiang Huang, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 21 days.

(21) Appl. No.: 14/255,964

(22) Filed: Apr. 18, 2014

(65) Prior Publication Data

US 2014/0225583 A1    Aug. 14, 2014

Related U.S. Application Data

(63) Continuation-in-part of application No. 13/541,667, filed on Jul. 4, 2012, now Pat. No. 8,742,745.

(30) Foreign Application Priority Data

Jul. 27, 2011 (TW) .............................. 100126620 A

(51) Int. Cl.
*H02M 3/156* (2006.01)
*H02M 1/44* (2007.01)
*H02M 3/157* (2006.01)
*H02M 1/00* (2007.01)

(52) U.S. Cl.
CPC ............... *H02M 3/156* (2013.01); *H02M 1/44* (2013.01); *H02M 3/157* (2013.01); *H02M 2001/0025* (2013.01); *H02M 2001/0032* (2013.01); *Y02B 70/16* (2013.01)

(58) Field of Classification Search
CPC .............................................. H02M 2001/0032
See application file for complete search history.

(56) References Cited

U.S. PATENT DOCUMENTS

| 4,820,891 | A  | * | 4/1989  | Tanaka et al. ................. 219/626 |
| 6,215,288 | B1 | * | 4/2001  | Ramsey et al. ............... 323/224 |
| 6,348,780 | B1 | * | 2/2002  | Grant ............................ 323/222 |
| 6,366,070 | B1 | * | 4/2002  | Cooke et al. .................. 323/284 |
| 7,106,130 | B2 | * | 9/2006  | Gan et al. ........................ 330/10 |
| 7,586,767 | B1 | * | 9/2009  | Prodic et al. ..................... 363/65 |
| 7,821,236 | B2 | * | 10/2010 | Hasegawa et al. ............ 323/222 |
| 2005/0007087 | A1 | * | 1/2005 | Pullen et al. .................. 323/283 |
| 2006/0119340 | A1 | * | 6/2006 | Tateishi ......................... 323/284 |
| 2008/0022139 | A1 | * | 1/2008 | Lin et al. ....................... 713/320 |
| 2008/0042709 | A1 | * | 2/2008 | Chen et al. .................... 327/175 |
| 2008/0129265 | A1 | * | 6/2008 | Rosenthal ..................... 323/283 |

(Continued)

FOREIGN PATENT DOCUMENTS

CN              101483386           7/2009

OTHER PUBLICATIONS

"Office Action of China Counterpart Application", issued on Jun. 25, 2014, p. 1-p. 6.

*Primary Examiner* — Timothy J Dole
*Assistant Examiner* — Yusef Ahmed
(74) *Attorney, Agent, or Firm* — Jianq Chyun IP Office

(57) ABSTRACT

A DC-DC converter is provided. When a load of the DC-DC converter is too light, the DC-DC converter can raise a frequency of its PWM signal, and reduce a pulse width of the PWM signal, so as to avoid the frequency of the PWM signal falling into a frequency range that can heard by human's ear and maintain high conversion efficiency of the DC-DC converter.

12 Claims, 7 Drawing Sheets

(56) References Cited

U.S. PATENT DOCUMENTS

| | | |
|---|---|---|
| 2008/0224674 A1* | 9/2008 | Hasegawa ............... 323/271 |
| 2009/0153114 A1* | 6/2009 | Huang .................... 323/282 |
| 2009/0160414 A1* | 6/2009 | Hachiya et al. ......... 323/283 |
| 2010/0219803 A1* | 9/2010 | Han et al. ............... 323/284 |
| 2010/0237838 A1* | 9/2010 | Templeton .............. 323/271 |
| 2011/0109398 A1* | 5/2011 | Tang et al. .............. 332/110 |
| 2011/0175584 A1* | 7/2011 | Huber et al. ............ 323/282 |
| 2011/0215734 A1* | 9/2011 | Shim ...................... 315/294 |
| 2011/0304308 A1* | 12/2011 | Wan et al. .............. 323/288 |
| 2011/0316502 A1* | 12/2011 | Tang et al. .............. 323/271 |
| 2012/0062299 A1* | 3/2012 | Kurokawa ............... 327/237 |
| 2012/0126768 A1* | 5/2012 | Ishino .................... 323/283 |
| 2013/0027012 A1* | 1/2013 | Huang .................... 323/283 |

* cited by examiner

DC-DC CONVERTER AND VOLTAGE CONVERSION METHOD THEREOF

CROSS-REFERENCE TO RELATED APPLICATION

This application is a continuation-in-part application of and claims the priority benefit of a prior application Ser. No. 13/541,667, filed on Jul. 4, 2012, now pending. The prior application Ser. No. 13/541,667 claims the priority benefit of Taiwan application serial no. 100126620, filed on Jul. 27, 2011. The entirety of each of the above-mentioned patent applications is hereby incorporated by reference herein and made a part of this specification.

BACKGROUND OF THE INVENTION

1. Field of the Invention

The invention relates to a direct current (DC)-DC converter. Particularly, the invention relates to a DC-DC converter capable of adjusting a pulse width of a pulse width modulation (PWM) signal, and a voltage conversion method thereof 2. Description of Related Art It is known to all that operating voltages of a central processing unit (CPU), a dynamic random access memory (DRAM), a graphic chip, a chip set in a computer system are different, so that a plurality of direct current (DC)-DC converters are used to convert a DC input voltage (for example, 19V) provided by a power supplier into the operating voltages required by various components. A constant on time (COT) regulator is a DC-DC converter. Generally, when a feedback voltage is smaller than a reference voltage, the COT regulator can turn on a main switch in a fixed period, and can adjust a non-conducting period of the main switch to provide a regulated voltage.

When a load variation of the COT regulator is dramatic, an operating frequency of a pulse width modulation (PWM) signal of the COT regulator is correspondingly varied. For example, when the load of the COT regulator becomes lighter, the frequency of the PWM signal is degreased, and a distance between pulses is increased. When the load of the COT regulator becomes very light, the frequency of the PWM signal is lower than 25KHz, by now the frequency falls into a frequency range that can be received by human's ear. Therefore, when the user uses an electronic product applying the COT regulator (for example, a mobile phone, a computer or a walkman, etc.), noise interference is occurred, which may decrease utilization quality of the electronic product.

SUMMARY OF THE INVENTION

The invention is directed to a direct current (DC)-DC converter and a voltage conversion method thereof, which maintains an operating frequency of a pulse width modulation (PWM) signal to be higher than a frequency range that can be received by human's ear in case that a voltage conversion efficiency is not influenced.

The invention provides a direct current (DC)-DC converter including an adjustment circuit and a control circuit. The adjustment circuit outputs a pulse width modulation (PWM) according to a first control signal and a second control signal. The control circuit is coupled to the adjustment circuit for detecting a frequency of the first control signal or the PWM signal, where when the frequency of the first control signal or the PWM signal is lower than a predetermined frequency, the control circuit outputs the second control signal to the adjustment circuit to reduce a pulse width of the PWM signal.

In an embodiment of the invention, the first control signal is determined by an error signal and a ramp signal.

In an embodiment of the invention, the control circuit includes a frequency detecting unit and a reduction control unit. The frequency detecting unit detects a transition time point of a rising edge of the first control signal or the PWM signal in each signal period for providing a frequency detecting result. The reduction control unit is coupled to the frequency detecting unit and the adjustment circuit, and provides the second control signal to the adjustment circuit according to the frequency detecting result.

In an embodiment of the invention, the control circuit includes a frequency detecting unit and a reduction control unit, the reduction control unit is coupled to the frequency detecting unit and provides the second control signal to the adjustment circuit according to a frequency detecting result generated by the frequency detecting unit.

In an embodiment of the invention, the adjustment circuit includes a timing generator and a control logic. The timing generator is coupled to the reduction control unit and provides a timing signal. The control logic is coupled to the timing generator and receives the first control signal and the timing signal to provide the PWM signal. The pulse width of the PWM signal is determined by the timing signal.

In an embodiment of the invention, the reduction control unit includes an adjustable current source which is coupled to a timing generator of the adjustment circuit, and provides the second control signal to the timing generator to reduce the pulse width of the PWM signal.

In an embodiment of the invention, the reduction control unit includes an operation unit and an adjustable voltage source. The operation unit is coupled to a timing generator of the adjustment circuit. The adjustable voltage source is coupled to the operation unit and provides a control voltage to the operation unit according to the frequency detecting result to reduce the pulse width of the PWM signal.

In an embodiment of the invention, the reduction control unit is a digital control circuit.

In an embodiment of the invention, the adjustment circuit includes a timing generator and a control logic. The timing generator is coupled to the control unit and providing a timing signal. The control logic is coupled to the timing generator and receives the first control signal and the timing signal to provide the PWM signal. The pulse width of the PWM signal is determined by the timing signal.

In an embodiment of the invention, the DC-DC converter includes an output unit which is coupled to the control circuit. When the frequency of the first control signal or the PWM signal is lower than a predetermined frequency, the control circuit outputs a third control signal to the output unit to make a next switching cycle be generated earlier.

In an embodiment of the invention, the output unit includes a first transistor and a second transistor. The first transistor and the second transistor are connected in series between am input voltage and a ground. The third control signal causes the second transistor to be turned on.

The invention provides a voltage conversion method, which is adapted to a DC-DC converter, and the voltage conversion method includes following steps. A PWM signal is output according to a first control signal and a second control signal. It is detected whether a frequency of the first control signal or the PWM signal is lower than a predetermined frequency, where when the frequency of the first control signal or the PWM signal is lower than the predetermined frequency, the second control signal is provided to reduce a pulse width of the PWM signal.

According to the above descriptions, the adjustment circuit is controlled to reduce the pulse width of the PWM signal according to the frequency of the PWM signal, which can maintain an operating frequency of the PWM signal to be higher than a frequency range that can be received by human's ear in case that a voltage conversion efficiency is not influenced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
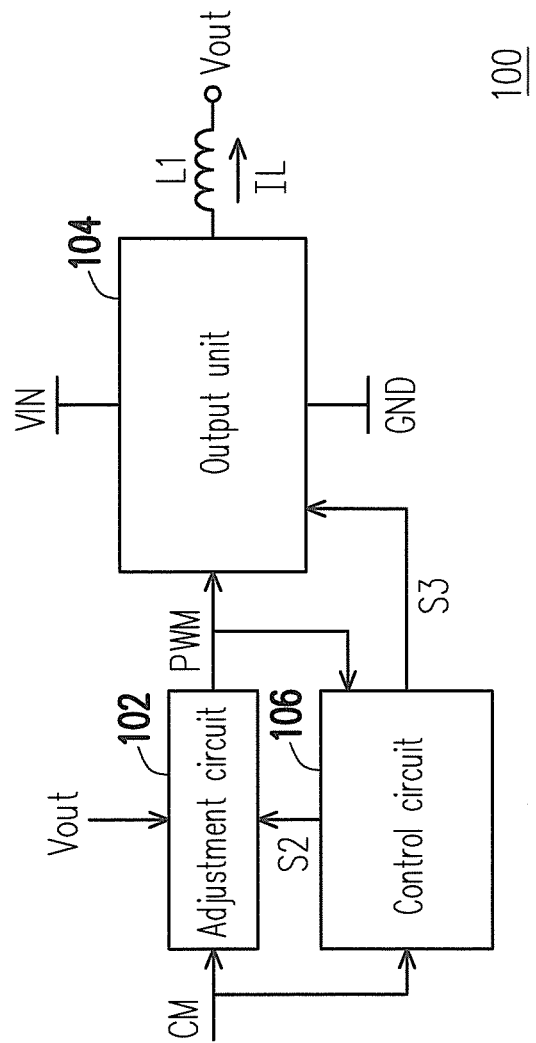
FIG. 1 is a schematic diagram of a direct current (DC)-DC converter according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In the following embodiments, when a device is described to be "connected" or "coupled" to another device, it is interpreted as that the device is directly connected to or coupled to the other device, or the device is indirectly connected to or coupled to the other device through other devices or connection means. A term "circuit" or "unit" represents at least one device or a plurality of devices, or devices actively and/or passively coupled to each other to provide a suitable function. A term "signal" represents at least one current, voltage, load, temperature, data or other signal. A ramp signal can also be a resemble ramp signal, a triangular wave signal or a sawtooth signal, which may have a repeat-descending type ramp or a repeat-rising type ramp, which is determined according to an actual application.

FIG. 1 is a schematic diagram of a direct current (DC)-DC converter according to an embodiment of the invention. Referring to FIG. 1, the DC-DC converter 100 includes an adjustment circuit 102, an output unit 104 and a control circuit 106. The adjustment circuit 102 is coupled to the output unit 104 and the control circuit 106, and the control circuit 106 is coupled to the output unit 104. The output unit 104 is coupled to a ground GND, an input voltage VIN of the DC-DC converter 100 and the control circuit 106.

Figure 2:
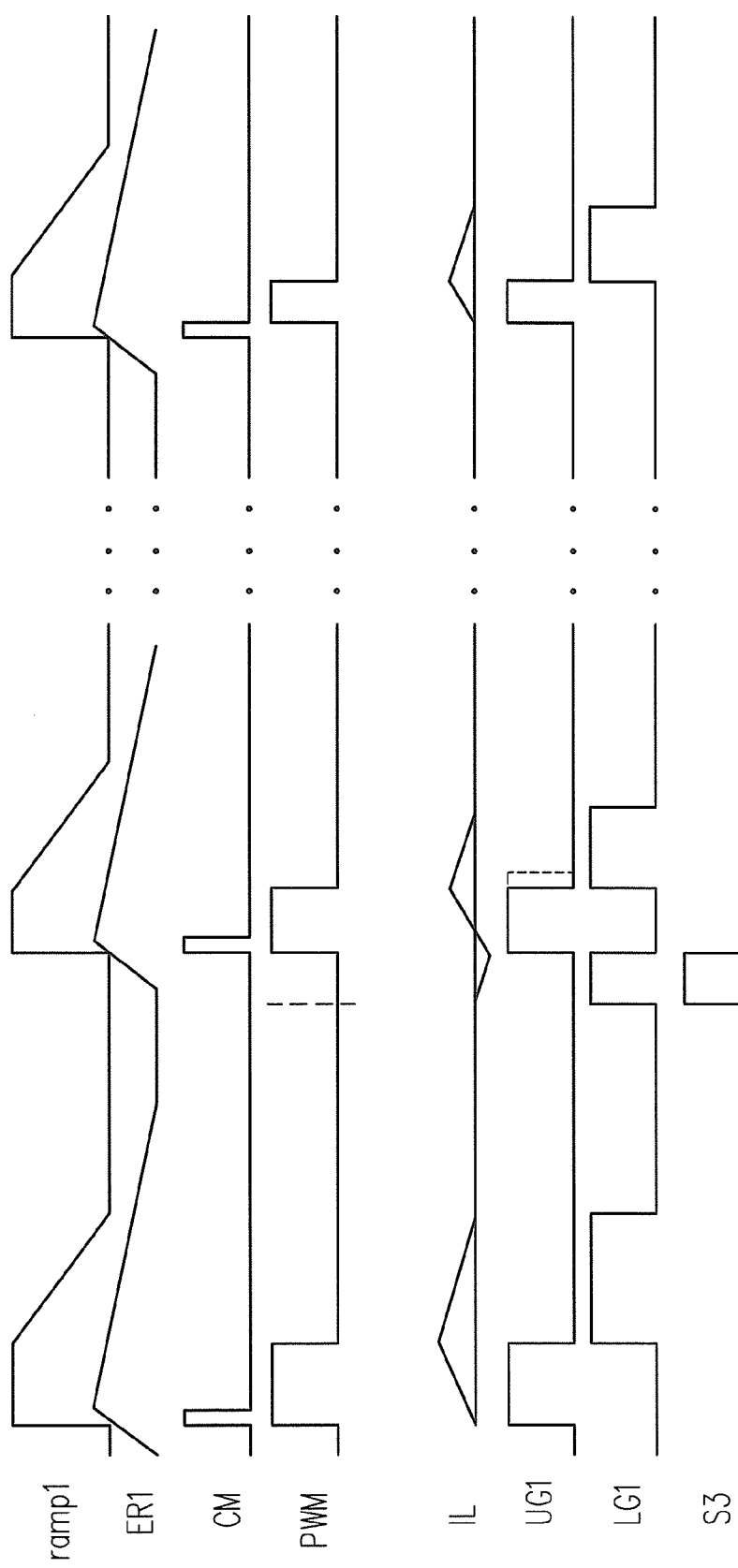
FIG. 2 is a waveform schematic diagram of a plurality of signals of a DC-DC converter according to an embodiment of the invention.

The adjustment circuit 102 receives a first control signal CM and an output voltage Vout of the DC-DC converter 100, and outputs a PWM signal PWM having a constant on time (COT) according to the first control signal CM and the output voltage Vout. FIG. 2 is a waveform schematic diagram of a plurality of signals of the DC-DC converter, as shown in FIG. 2, each time when a rising edge of the first control signal CM received by the adjustment circuit 102 is appeared, the adjustment circuit 102 outputs the PWM signal PWM having a predetermined pulse width. In this way, the output unit 104 converts the input voltage VIN for providing the output voltage in response to the PWM signal PWM.

Moreover, the control circuit 106 is used to detect a frequency of the PWM signal PWM or a frequency of the first control signal CM. In case of a normal load, the frequency of the PWM signal PWM is relatively high, i.e. a time between each two pulses thereof is shorter. When the load of the DC-DC converter 100 is in a light load condition, the frequency of the PWM signal PWM is decreased, i.e. the time between each two pulses is probably longer (for example, 100 us), which may fall into a frequency range that can be heard by human's ear.

When the frequency of the PWM signal PWM is lower than a predetermined frequency, i.e. the time between each two pulses exceeds a predetermined value (for example, 40 µs), the control circuit 106 outputs a third control signal S3 to control the output unit 104 to make a next switching cycle to be generated earlier. Moreover, the control circuit 106 provides a second control signal S2 to the adjustment circuit 102 to reduce the pulse width of the PWM signal PWM according to the frequency of the PWM signal PWM. In this way, the voltage conversion efficiency of the DC-DC converter 100 is still maintained as the frequency of the PWM signal PWM is increased, so as to resolve the problem of the conventional technique that the operating frequency of the DC-DC converter is excessively low and enters the frequency range that can be heard by human's ear.

When the PWM signal PWM is generated, the control circuit 106 again detects the frequency of the PWM signal PWM to determine whether it is lower than the predetermined frequency, and if yes, the aforementioned operations are continually executed, and until the control circuit 106 detects that the frequency of the PWM signal PWM is higher than the predetermined frequency, it stops adjusting the frequency of the PWM signal PWM, and maintains the pulse width of the PWM signal PWM.

Figure 3:
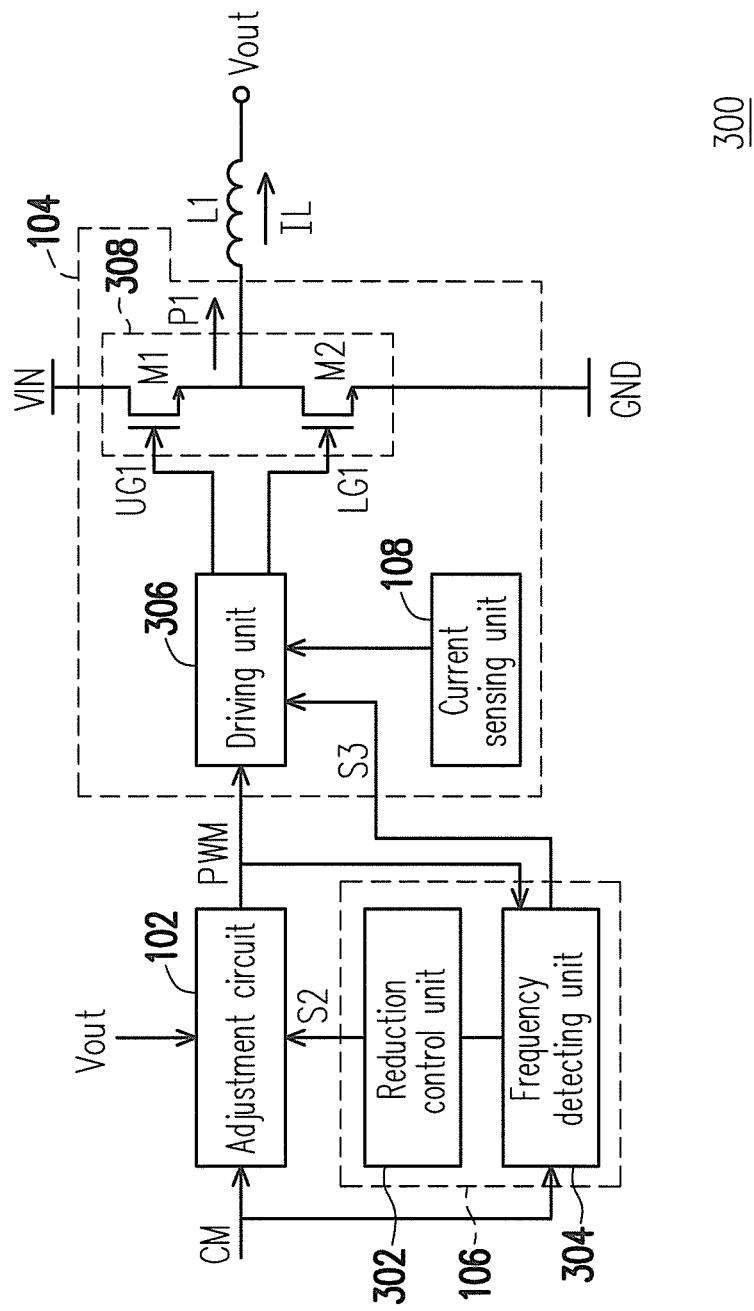
FIG. 3 is a schematic diagram of a DC-DC converter according to another embodiment of the invention.

FIG. 3 is a schematic diagram of a DC-DC converter according to another embodiment of the invention. Referring to FIG. 3, the control circuit 106 of FIG. 1 includes a reduction control unit 302 and a frequency detecting unit 304. The reduction control unit 302 is coupled to the adjustment circuit 102 and the frequency detecting unit 304. Moreover, the output unit 104 includes a driving unit 306, an output stage 308 and a current sensing unit 108. The driving unit 306 is coupled to the adjustment circuit 102, the frequency detecting unit 304 and the output stage 308. A first end of the inductor L1 is coupled to an output terminal of the DC-DC converter 100, and a second end thereof is coupled to the output stage 308. The output stage 308 is coupled to the input voltage VIN of the DC-DC converter 100 and the ground GND. The current sensing unit 108 is coupled to the driving unit 306, output stage 308 or the inductor L1.

The current sensing unit 108 is used for detecting a load current, for example, a current IL of the inductor L1. The driving unit 306 outputs switching signals UG1 and LG1 according to the PWM signal PWM, so as to control the output stage 308 to convert the input voltage VIN into the output voltage Vout.

In the present embodiment, the output stage 308 includes a first transistor M1 and a second transistor M2. The first transistor M1 and the second transistor M2 are connected in series between the input voltage VIN of the DC-DC converter 100 and the ground GND, and a common node of the first transistor M1 and the second transistor M2 is coupled to the second end of the inductor L1. Control terminals of the first transistor M1 and the second transistor M2 are coupled to the driving unit 306 for respectively receiving the switching signals UG1 and LG1.

When the second transistor M2 is in a turn-on state, the first transistor M1 is in a turn-off state, and when the first transistor M1 is in the turn-on state, the second transistor M2 is in the turn-off state. Moreover, when the current IL of the inductor L1 drops to zero, the driving unit 306 turns off the second transistor M2.

In the present embodiment, the frequency detecting unit 304 detects a transition time point of a rising edge of the PWM signal PWM in each signal period. In other embodiments, frequency detecting unit 304 can also detect a transition time point of a rising edge of the first control signal CM in each signal period.

As shown in FIG. 2, when the rising edge of the PWM signal PWM (or the first control signal CM) is delayed, the frequency detecting unit 304 generates a frequency detecting result to the reduction control unit and generates the third control signal to the driving unit 306. The third control signal S3 makes the driving unit 306 output the switching signal LG1 to the second transistor M2 to turn on the second transistor M2, so as to trigger a next switching cycle to be generated earlier.

Delay of the rising edge of the PWM signal PWM refers to that after the frequency detecting unit 304 detects appearance of a PWM signal PWM, it determines whether a next PWM signal PWM appears within a predetermined value (for example, 40 μs), and if the PWM signal PWM appears after the predetermined value, it represents that the rising edge of the PWM signal PWM is delayed.

As shown in FIG. 2, in other words, according to a predetermined frequency (for example, 25KHZ), the PWM signal PWM should be transited to a high voltage logic level at a time point shown by a dot line on the waveform of the PWM signal PWM, however, since the load at the output terminal of the DC-DC converter 300 becomes lighter, the frequency of the PWM signal PWM is decreased, a distance between two pulses thereof is broadened, and a time point that the PWM signal PWM is transited to the high voltage logic level is delayed. Now, the frequency detecting unit 304 outputs the third control signal S3 of the high voltage logic level to the driving unit 306, and the driving unit 306 provides the switching signal LG1 of the high voltage logic level to the output stage 308 to turn on the second transistor M2, so as to trigger the next first control signal CM to be generated earlier, where the third control signal S3 has the high voltage logic level.

It should be noticed that in the present embodiment, when the rising edge of the PWM signal PWM is delayed, although the current IL of the inductor L1 drops to zero, the event of rising edge delay has a higher priority, and the driving unit 306 forcibly turns on the second transistor M2 according to a priority mechanism and the third control signal S3 until the next first control signal is generated earlier. A mechanism for generating the first control signal CM earlier is described later.

As shown in FIG. 2, a second pulse of the PWM signal PWM has a narrower pulse width compared to that of a first pulse. When the PWM signal PWM is transited to the high voltage logic level, the switching signal LG1 is transited to a low voltage logic level, and the switching signal UG1 is transited to the high voltage logic level. Until the PWM signal PWM is transited to the low voltage logic level, the switching signal LG1 is transited to the high voltage logic level, and the switching signal UG1 is transited to the low voltage logic level. A pulse width of the switching signal UG1 is also narrowed due to an influence of the reduction of the pulse width of the PWM signal PWM. Moreover, when the current sensing unit 108 detects that the current IL of the inductor L1 drops to zero, the driving unit 306 transits the switching signal LG1 to the low voltage logic level.

It should be noticed that after the pulse width of the PWM signal PWM is reduced, when the PWM signal PWM is transited to the high voltage logic level for a next time as the rising edge of the first control signal CM is appeared, if the frequency of the PWM signal PWM is higher than the predetermined frequency, the pulse width of the PWM signal PWM is maintained the same to that of the former PWM signal PWM with the reduced pulse width. If the frequency of the PWM signal PWM is still lower than or equal to the predetermined frequency, the pulse width of the PWM signal PWM is again reduced according to the method as that described above. By repeatedly increasing the frequency of the PWM signal PWM and reducing the pulse width of the PWM signal PWM, the frequency of the PWM signal PWM can be adjusted to be greater than the predetermined frequency without influencing the voltage conversion efficiency of the DC-DC converter 300.

Figure 4:
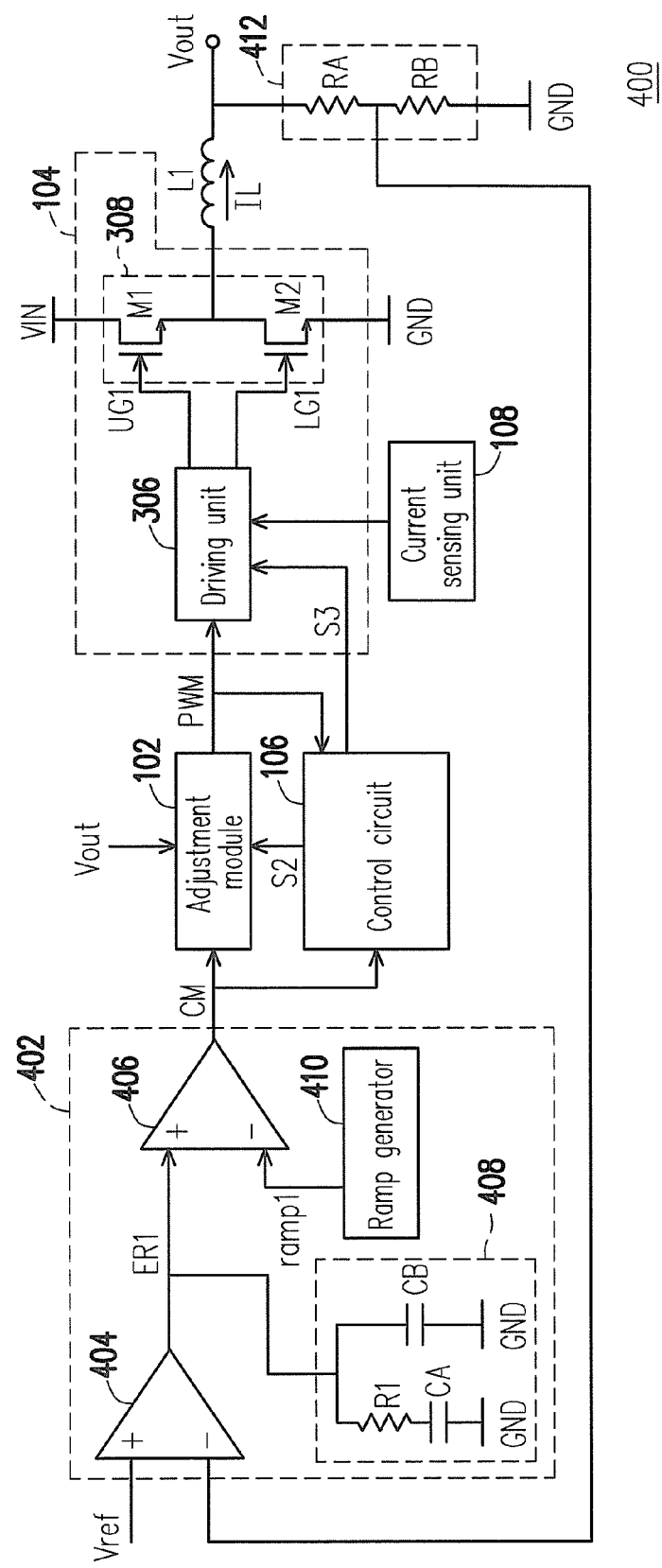
FIG. 4 is a schematic diagram of a DC-DC converter according to another embodiment of the invention.

The first control signal CM can be generated through a PWM control circuit. FIG. 4 is a schematic diagram of a DC-DC converter according to another embodiment of the invention. Referring to FIG. 4, a difference between the DC-DC converter 400 of the present embodiment and the DC-DC converter 100 of FIG. 1 is that the DC-DC converter 400 further includes a PWM control circuit 402 and a feedback unit 412. The feedback unit 412 is coupled to the adjustment circuit 102 and the PWM control circuit 402. The PWM control circuit 402 generates the first control signal CM which is determined by an error signal ER1 and a ramp signal ramp1, wherein the error signal ER1 is generated according to a reference voltage Vref and a feedback voltage provided by the feedback unit 412, and the ramp signal is provided by the ramp generator 410.

In detail, the PWM control circuit 402 includes the error amplifier 404, a compensation unit 408, the ramp generator 410 and a second comparator 406. A first input terminal and a second input terminal of the error amplifier 404 are respectively coupled to the reference voltage Vref and the feedback unit 412, and the error amplifier 404 generates the error signal ER1 according to the reference voltage Vref and the feedback voltage.

The compensation unit 408 is coupled to an output terminal of the error amplifier 404, and in the compensation unit 408 of the present embodiment, a resistor R1 and a capacitor CA are connected in series and are further connected in parallel with a capacitor CB, though the invention is not limited thereto. A first input terminal and a second input terminal of the second comparator 406 are respectively coupled to the output terminal of the error amplifier 404 and the ramp generator 410. The compensation unit 408 is used for compensating the error signal ER1, and after the error signal ER1 is compensated, the second comparator 406 compares the error signal ER1 with a ramp signal ramp1 provided by the ramp generator 410 to generate the first control signal CM. Waveforms of the error signal ER1, the ramp signal ramp1 and the first control signal CM are as that shown in FIG. 2.

In case of a normal operation, i.e. the frequency of the first control signal CM (or the PWM signal PWM) is greater than the predetermined frequency, the output voltage Vout is slowly pulled down due to that the current IL of the inductor L1 is greater than zero, and makes the PWM control circuit 402 to generate the first control signal CM after a certain time period.

However, when the rising edge of the PWM signal PWM is delayed, the current IL of the inductor L1 is zero now, and the output voltage Vout is quickly pulled down to make the error amplifier 404 to generate the error signal ER1, so that the PWM control circuit 402 generates the first control signal CM earlier, so as to provide the PWM signal PWM.

After the error amplifier 404 generates the error signal ER1, the output of the error amplifier 404 charges the capacitors CA and CB to gradually pull high a voltage level of the error signal ER1. When the voltage level of the error signal ER1 is pulled up to be higher than the ram signal ramp1, the second comparator 406 outputs the first control signal CM with the high voltage logic level, so that the next first control signal PWM is triggered to be generated, and the PWM signal PWM is accordingly generated. Now, the frequency detecting unit 304 provides the second control signals to the reduction control unit 302 to control the adjustment circuit 102 to reduce the pulse width of the PWM signal PWM.

Figure 5:
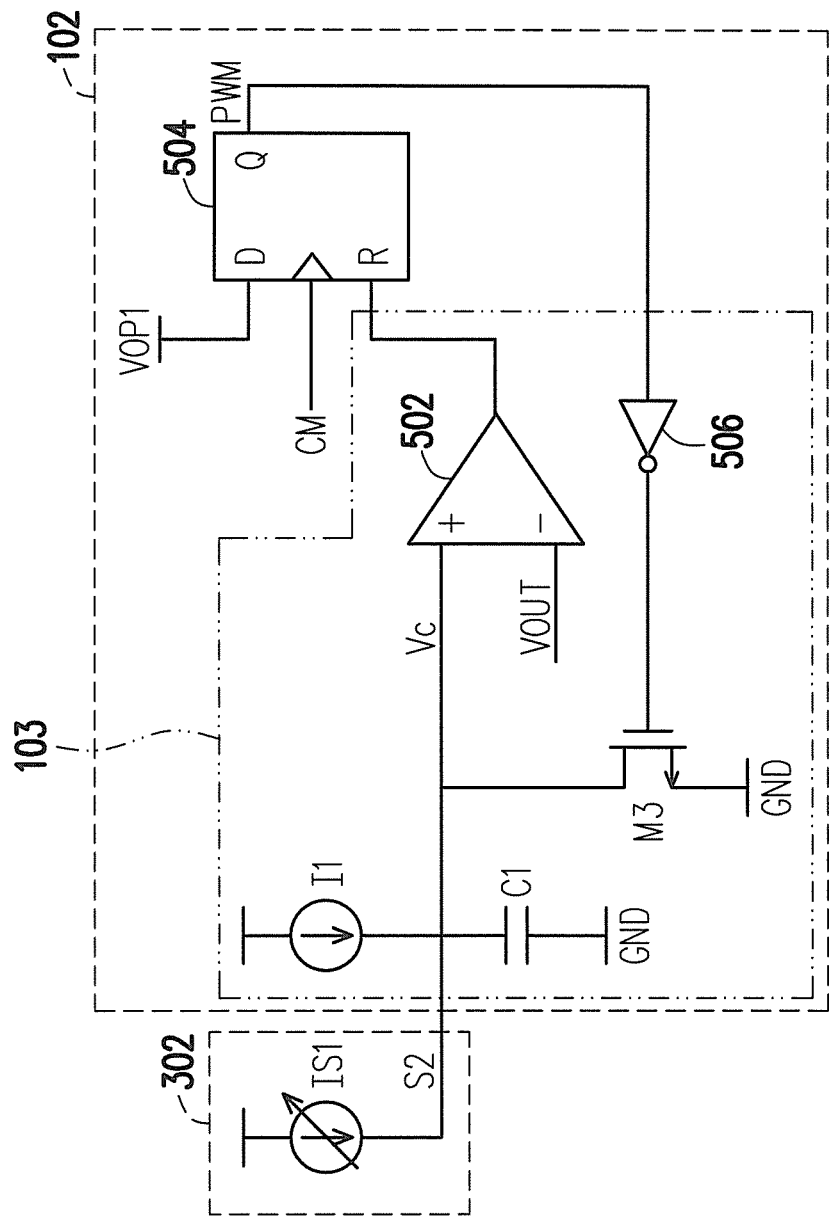
FIG. 5 and FIG. 6 are schematic diagrams of an adjustment circuit and a reduction control unit according to another embodiment of the invention.

In detail, implementations of the adjustment circuit 102 and the reduction control unit 302 are as that shown in FIG. 5. The adjustment circuit 102 includes a control logic 504 and a timing generator 103, wherein the timing generator 103 is coupled to the control logic 504 and the reduction control unit 302 to provide a timing signal. The pulse width of the PWM signal is determined by the timing signal. The control logic 504 is coupled to the timing generator 103 and receives the first control signal CM and the timing signal from the timing generator 103 to provide the PWM signal. The timing generator 103 includes a first comparator 502, a first current source I1, a first capacitor C1, a third transistor M3 and an inverter 506. Moreover, the reduction control unit 302 includes an adjustable current source IS1 and providing the second control signal, such as adjustable current, to the timing generator 103 to reduce the pulse width of the PWM signal. The first current source I1 and the adjustable current source IS1 are coupled to a first input terminal of the first comparator 502. The first capacitor C1 is coupled between the first input terminal of the first comparator 502 and the ground GND. A drain and a source of the third transistor M3 are respectively coupled to the first input terminal of the first comparator 502 and the ground GND. A data input terminal D of the control logic 504 is coupled to a first operating voltage VOP, a clock input terminal of the control logic 504 is coupled to the first control signal CM, a reset terminal R of the control logic 504 is coupled to an output terminal of the first comparator 502, and a data output terminal Q of the control logic 504 is coupled to the driving unit 306. Moreover, the inverter 506 is coupled between the data output terminal Q of the control logic 504 and a gate of the third transistor M3.

According to FIG. 5, it is known that the pulse width of the PWM signal PWM is determined by the timing signal, wherein the timing signal is determined by the first control signal CM. The control logic 504 outputs a signal from the data input terminal D to the data output terminal Q according to the first control signal CM to generate the PWM signal PWM, and the output, such as timing signal, of the first comparator 502 can be used to reset the control logic 504 to change the pulse width of the PWM signal PWM. In the present embodiment, a voltage of the first input terminal of the first comparator 502 is a voltage Vc on the first capacitor C1, and variation of the voltage Vc on the first capacitor C1 is determined by the first current source I1 and the adjustable current source IS1. When the rising edge of the PWM signal PWM is delayed, the adjustable current source IS1 charges the first capacitor C1 according to a transition delay time of the rising edge of the PWM signal PWM. A speed of voltage increase of the voltage Vc can be controlled by adjusting an output current of the adjustable current source IS1, so as to control the pulse width of the PWM signal PWM (i.e. a conducting time of the PWM signal PWM).

For example, when the output current of the adjustable current source IS1 is increased, the pulse width of the PWM signal PWM is to be reduced, so that the voltage Vc can quickly reach a value higher than the output voltage Vout, and the control logic 504 is reset to transit the PWM signal PWM to the low voltage logic level. The greater the output current of the adjustable current source IS1 is, the faster the voltage Vc reaches the value higher than the output voltage Vout, and the narrower the pulse width of the PWM signal PWM is.

It should be noticed that the reduction control unit 302 is, for example, a digital control circuit, and a current magnitude of the adjustable current source IS 1 is, for example, controlled by a least significant bit (LSB). When the frequency of the PWM signal PWM is adjusted to be higher than the predetermined frequency, the digital signal controlling the adjustable current source IS1 is fixed, so that the PWM signal PWM output by the second adjustment circuit 102 is maintained to the adjusted pulse width.

Figure 6:
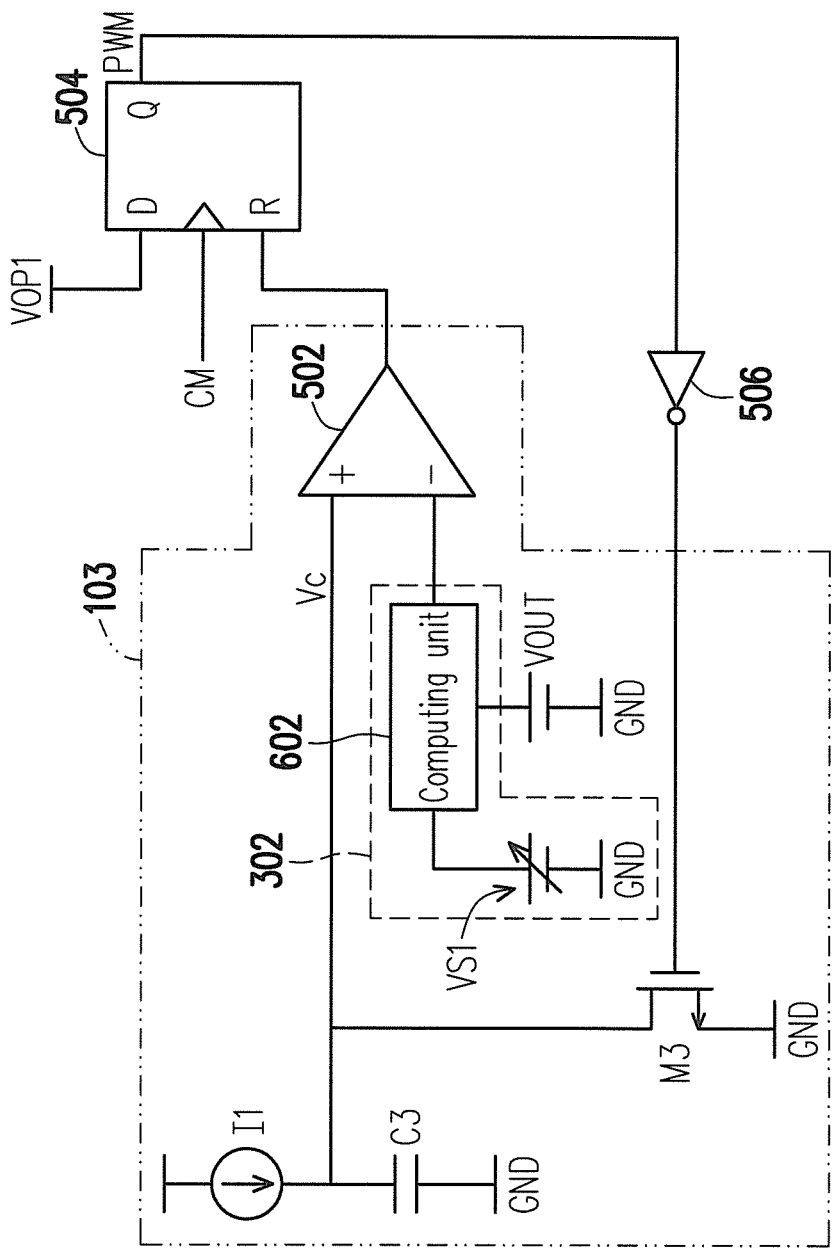

FIG. 6 is a schematic diagram of an adjustment circuit and a reduction control unit according to another embodiment of the invention. Referring to FIG. 6, a difference between the present embodiment and the embodiment of FIG. 5 is that in the embodiment of FIG. 5, the pulse width of the PWM signal PWM is adjusted through the current magnitude of the adjustable current source IS1, and in the present embodiment, an adjustable voltage source VS1 is used to adjust the pulse width of the PWM signal PWM. As shown in FIG. 6, the reduction control unit 302 includes an operation unit 602 and the adjustable voltage source VS1, where the operation unit 602 is coupled between the second input terminal of the first comparator 502 and the output voltage Vout, and the adjustable voltage source VS1 is coupled between the operation unit 602 and the ground GND.

Similarly, when the rising edge of the PWM signal PWM is delayed, the adjustable voltage source VS1 provides a control voltage to the operation unit 602 according to the frequency result, and the operation unit 602 subtracts the control voltage from the output voltage, so as to control the generating of the timing signal for adjusting the pulse width of the PWM signal PWM.

For example, when the control voltage output by the adjustable voltage source VS1 is increased, the pulse width of the PWM signal PWM is to be reduced, so that the output voltage Vout can be quickly pulled down to a value lower than the voltage Vc, and the control logic 504 is reset to transit the PWM signal PWM to the low voltage logic level. The greater the control voltage output by the adjustable voltage source VS1 is, the faster the output voltage Vout is pulled down to the value lower than the voltage Vc, and the narrower the pulse width of the PWM signal PWM is.

Similarly, a magnitude of the control voltage output by the adjustable voltage source VS1 is also, for example, controlled by the LSB. When the frequency of the PWM signal PWM is adjusted to be higher than the predetermined frequency, the digital signal controlling the adjustable voltage source VS1 is fixed, so that the PWM signal PWM output by the second adjustment circuit 102 is maintained to the adjusted pulse width.

Figure 7:
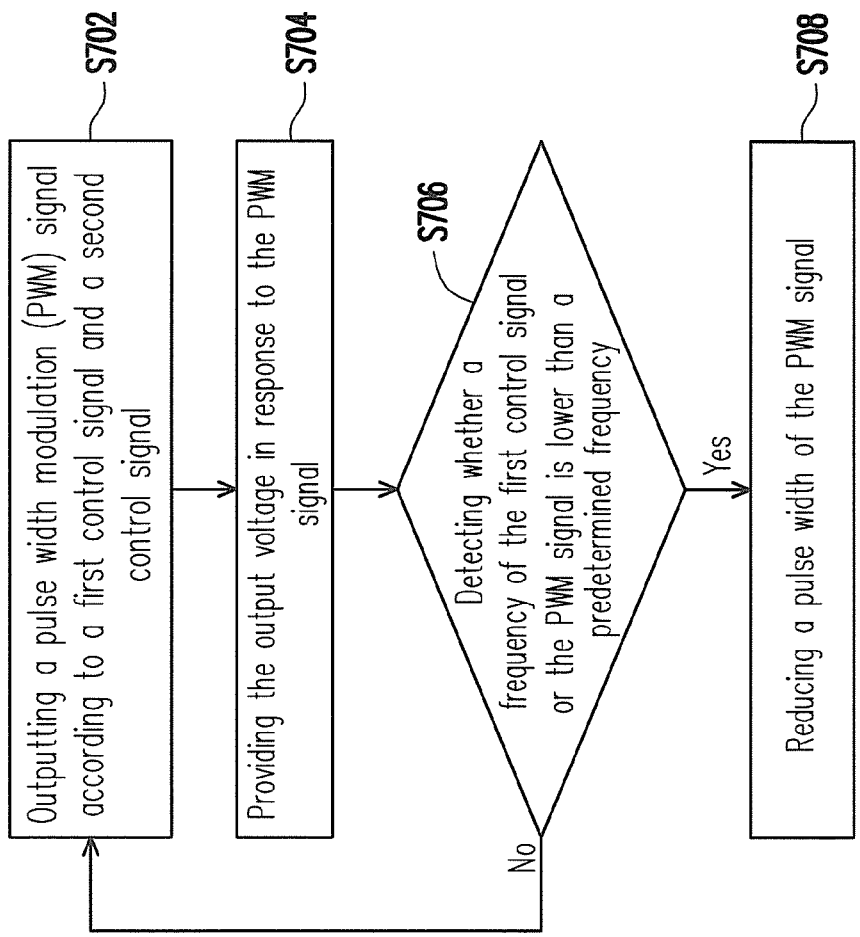
FIG. 7 is a flowchart illustrating a voltage conversion method of a DC-DC converter according to an embodiment of the invention.

FIG. 7 is a flowchart illustrating a voltage conversion method of a DC-DC converter according to an embodiment of the invention. Referring to FIG. 7, steps of the voltage conversion method of the DC-DC converter are described as follows. First, a PWM signal is output according to a first control signal and a second control signal (step S702). Then, the output voltage is provided in response to the PWM signal (step S704). Then, it is detected whether a frequency of the first control signal or the PWM signal is lower than a predetermined frequency (step S706). When the frequency of the first control signal or the PWM signal is lower than the predetermined frequency, the pulse width of the PWM signal is reduced (step S708). Comparatively, when the frequency of the PWM signal is higher than the predetermined frequency, the pulse width of the PWM signal is not adjusted, and the step S702 is returned, and the PWM signal is output according to the first control signal and the second control signal.

In summary, when a load of the DC-DC converter is too light, the DC-DC converter can raise the frequency of its PWM signal, and reduce the pulse width of the PWM signal according to the frequency of the PWM signal, so as to avoid the frequency of the PWM signal falling into a frequency range that can heard by human's ear and maintain a high conversion efficiency of the DC-DC converter.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A direct current (DC)-DC converter, comprising:
   an adjustment circuit, outputting a pulse width modulation (PWM) signal according to a first control signal and a second control signal; and
   a control circuit, coupled to the adjustment circuit, for detecting a frequency of the first control signal or the PWM signal, wherein the control circuit comprises a frequency detecting unit and a reduction control unit, the reduction control unit is coupled to the frequency detecting unit and provides the second control signal to the adjustment circuit according to a frequency detecting result generated by the frequency detecting unit, wherein the reduction control unit comprises an adjustable current source, coupled to a timing generator of the adjustment circuit, and providing the second control signal to the timing generator to reduce a pulse width of the PWM signal,
   wherein when the frequency of the first control signal or the PWM signal is lower than a predetermined frequency, the control circuit outputs the second control signal to the adjustment circuit to reduce the pulse width of the PWM signal.

2. The DC-DC converter as claimed in claim 1, wherein the first control signal is determined by an error signal and a ramp signal.

3. The DC-DC converter as claimed in claim 1, wherein the control circuit comprises: the frequency detecting unit, detecting a transition time point of a rising edge of the first control signal or the PWM signal in each signal period for providing the frequency detecting result; and
   the reduction control unit, coupled to the frequency detecting unit and the adjustment circuit, and providing the second control signal to the adjustment circuit according to the frequency detecting result.

4. The DC-DC converter as claimed in claim 1, wherein the adjustment circuit comprises a timing generator and a control logic, the timing generator is coupled to the reduction control unit and provides a timing signal, the control logic is coupled to the timing generator and receives the first control signal and the timing signal to provide the PWM signal, wherein the pulse width of the PWM signal is determined by the timing signal.

5. The DC-DC converter as claimed in claim 1, wherein the reduction control unit comprises:
   an operation unit, coupled to a timing generator of the adjustment circuit; and
   an adjustable voltage source, coupled to the operation unit, the adjustable voltage source providing a control voltage to the operation unit according to the frequency detecting result to reduce the pulse width of the PWM signal.

6. The DC-DC converter as claimed in claim 1, wherein the reduction control unit is a digital control circuit.

7. The DC-DC converter as claimed in claim 1, wherein the adjustment circuit comprises:
   a timing generator, coupled to the control unit and providing a timing signal; and
   a control logic, coupled to the timing generator, and receiving the first control signal and the timing signal to provide the PWM signal,
   wherein the pulse width of the PWM signal is determined by the timing signal.

8. The DC-DC converter as claimed in claim 1, further comprising an output unit, coupled to the control circuit, when the frequency of the first control signal or the PWM signal is lower than a predetermined frequency, the control circuit outputs a third control signal to the output unit to make a next switching cycle be generated earlier.

9. The DC-DC converter as claimed in claim 8, wherein the output unit includes a first transistor and a second transistor, the first transistor and the second transistor connected in series between an input voltage and a ground, the third control signal causing the second transistor be turned on.

10. A voltage conversion method, adapted to a direct current (DC)-DC converter, the voltage conversion method comprising:
    outputting a PWM signal according to a first control signal and a second control signal;
    detecting whether a frequency of the first control signal or the PWM signal is lower than a predetermined frequency;
    provides the second control signal according to a frequency detecting result; and
    providing the second control signal to reduce a pulse width of the PWM signal,
    wherein when the frequency of the first control signal or the PWM signal is lower than the predetermined frequency, the second control signal is provided to reduce the pulse width of the PWM signal.

11. A direct current (DC)-DC converter, comprising:
    an adjustment circuit, outputting a pulse width modulation (PWM) signal according to a first control signal and a second control signal; and
    a control circuit, coupled to the adjustment circuit, for detecting a frequency of the first control signal or the PWM signal, wherein the control circuit comprises a frequency detecting unit and a reduction control unit, the reduction control unit is coupled to the frequency detecting unit and provides the second control signal to the adjustment circuit according to a frequency detecting result generated by the frequency detecting unit, wherein the reduction control unit comprises:

an operation unit, coupled to a timing generator of the adjustment circuit; and an adjustable voltage source, coupled to the operation unit, the adjustable voltage source providing a control voltage to the operation unit according to the frequency detecting result to reduce a pulse width of the PWM signal, wherein when the frequency of the first control signal or the PWM signal is lower than a predetermined frequency, the control circuit outputs the second control signal to the adjustment circuit to reduce the pulse width of the PWM signal.

12. A voltage conversion method, adapted to a direct current (DC)-DC converter, the voltage conversion method comprising:

outputting a PWM signal according to a first control signal and a second control signal; and detecting whether a frequency of the first control signal or the PWM signal is lower than a predetermined frequency;

provides the second control signal according to a frequency detecting result; and providing an adjustable voltage source to provide a control voltage according to the frequency detecting result to reduce a pulse width of the PWM signal, wherein when the frequency of the first control signal or the PWM signal is lower than the predetermined frequency, the second control signal is provided to reduce the pulse width of the PWM signal.

* * * * *